United States Patent [19]

Skauli et al.

[11] 4,166,839

[45] Sep. 4, 1979

[54] METHOD FOR PRODUCING CALCIUM PHOSPHATES

[75] Inventors: Öyvind Skauli; Jan B. Isaksen, both of Porsgrunn, Norway

[73] Assignee: Norsk Hydro A.S, Oslo, Norway

[21] Appl. No.: 816,869

[22] Filed: Jul. 18, 1977

Related U.S. Application Data

[63] Continuation-in-part of Ser. No. 560,086, Mar. 19, 1975, abandoned.

[30] Foreign Application Priority Data

Mar. 19, 1974 [NO] Norway ................... 740984

[51] Int. Cl.$^2$ ............... C01B 15/16; C01B 25/26
[52] U.S. Cl. .................................. 423/311; 423/309; 71/43
[58] Field of Search ............... 423/309, 305, 307, 308, 423/310–313; 71/43

[56] References Cited

U.S. PATENT DOCUMENTS

| | | | |
|---|---|---|---|
| 2,108,940 | 2/1938 | MacIntire | 423/309 |
| 2,121,208 | 6/1938 | Milligan | 423/309 |
| 2,977,190 | 3/1961 | Yates et al. | 423/309 |
| 3,409,394 | 11/1968 | Sprigg | 71/33 X |
| 3,464,808 | 8/1969 | Kearns | 71/43 X |

FOREIGN PATENT DOCUMENTS 557623  5/1958  Canada ................... 423/313

*Primary Examiner*—O. R. Vertiz
*Assistant Examiner*—G. A. Heller
*Attorney, Agent, or Firm*—Wenderoth, Lind & Ponack

[57] ABSTRACT

Animal feed grade phosphates such as mono-calcium phosphate, di-calcium phosphate or mixtures thereof are produced by direct reaction between phosphoric acid and Ca-containing materials. A finely ground, preheated calcium carbonate suspension is brought to react with a suitable quantity of preheated phosphoric acid by introducing the reactants into a short, tubular reaction zone, open at one end, whereby development of gas and intensive mixing of the reactants in the reaction zone take place. The gas formed by the reaction expels or ejects the foaming reaction mixture from the tube-like reaction zone, the reaction being substantially completed while the individual particles of the mixture are freely suspended in air or gas, whereafter the reacted mixture is collected in the form of a free-flowing granulate having improved handling properties, without any further quenching treatment of the granules. An apparatus for carrying out the process includes a reaction chamber connected with separate feed lines for calcium carbonate suspension and phosphoric acid, respectively, and means for collecting and further processing the resultant reaction product. The reaction chamber has the form of a tube reactor having an open end portion which forms a discharge which is arranged for cooperation with a suspension chamber and a collecting device arranged at the lower end of the chamber.

15 Claims, 3 Drawing Figures

METHOD FOR PRODUCING CALCIUM PHOSPHATES

This is a continuation-in-part of application Ser. No. 560,086, filed Mar. 19, 1975, now abandoned.

BACKGROUND OF THE INVENTION

This invention relates to a method and apparatus for producing calcium phosphates from phosphoric acid and mineral calcium compounds. More particularly, the invention relates to a method for manufacturing animal feed grade phosphates, mono-calcium phosphate (MCP) and di-calcium phosphate (DCP) or a mixture thereof containing P and Ca in a specified ratio and in a form in which the phosphorus component can be readily absorbed by the animal organism. Such mineral feed additives must comply with certain standards of purity with respect to content of fluorine, arsenic and heavy metals. To facilitate handling and use it is important that these feed grade phosphates are in the form of strong and free-flowing granulates of appropriate liter weight and grain size, and that they possess good storage properties.

The manufacture of such animal feed grade phosphates by reaction between phorphoric acid and fine-grained mineral calcium compounds is known.

It is further known to carry out the reaction by direct conversion between a purified, comparatively concentrated phosphoric acid and a purified calcium component which may, if necessary, be in the form of an aqueous suspension. During conversion the reaction mixture will first pass through a glutinous and sticky phase, after which it will harden as reaction continues. This gives consistency and handling problems which cause serious trouble during these stages of the reaction.

When the calcium components are present in the form of $CaCO_3$ considerable quantities of gas will be formed during the reaction, which further increases the consistency and handling problems in the apparatus. This is probably the reason why so many prior known processes for the manufacture of animal feed grade phosphates prescribe the use of other calcium compounds which cause less serious consistency and handling problems.

The reaction mixture is so glutinous and viscous that very powerful mixing is necessary during further processing. In the prior known granulating techniques there are difficulties in handling the mixture without recycling considerable quantities of the reacted product.

The consistency problems also make it difficult to achieve homogenization and proper mixing of the reaction mass. Local concentrations of acid resulting from inadequate mixing will in turn result in a product with inferior handling and storage properties.

Because of these special difficulties no one, as far as is know, has yet succeeded in developing a simple and technically reliable process for the manufacture of non-dusting granulated animal feed grade phosphates from phosphoric acid and $CaCO_3$. According to South African Pat. No. 66/7774, which relates to such a reaction process, the granulating stage is eliminated and the viscous and sticky reaction mixture is transferred instead to a slow-moving conveyor belt on which the reaction is completed during hardening of the reaction product. The solid mass is then crushed by means of a rotary crusher. However, this results in an unsatisfactory product with angular, uneven grains and considerable dust.

According to Norwegian Pat. No. 100,875 the reaction is carried out in the form of a batch process without an aqueous phase, and with rapid mixing with finely ground limestone and 80% phosphoric acid in a pan mixer. Agglomerates appear for a short period but these are broken down by the mixer as they appear and a slightly plastic powder is formed. A particular disadvantage in this process is the time factor, since the reaction requires a period of up to fifty hours. Neither is the powdered product sufficiently free-flowing, nor is it particularly suitable for mixing with the usual animal feedstuffs.

However, it is also a known prior procedure to reduce the reaction period by utilizing a greater amount of water and using a known prior wet granulation technique. The aqueous reaction components must then be distributed in a greater quantity of reacted return material, recycled from the product screens to the granulator. Swedish Patent Application Ser. No. 340,443, open to public inspection, relates to such a process, but its workability depends on the use of considerable quantities of reacted, recycled material, as much as up to twenty-five times the weight of the reaction mixture, during the granulating process. The reaction components are distributed in this recycled material. The use of such recycled material complicates the process and reduces the production capacity of the granulation stage. Close and careful control of the reaction conditions with respect to the water/acid ratio, reaction time and temperature is also difficult with this process.

SUMMARY OF THE INVENTION

The present invention provides a new and improved method and apparatus for the production of granulated animal feed grade phosphates from phosphoric acid and an aqueous suspension of calcium carbonate.

It is the object of this invention to provide a simple and effective method and apparatus suitable for modern industrial plants, and employable for the continuous and direct production of free-flowing granulates in the form of MCP or DCP or a mixture thereof, which are easy to handle and which have good storage properties.

Another object of the invention is to provide a process and apparatus whereby a viscous and sticky reaction mixture will not prevent the intensive mixing which is necessary to obtain a reaction and at the same time achieve a stable consistency which provides an efficient and controllable process, giving a solid granulated material with grain size and properties as desired.

A further object of the invention is to provide a process which can also be carried out with Ca-containing phosphoric acid, a starting material which when used in conventional animal feed grade phosphate production processes causes the most difficult consistency problems.

The reaction between phosphoric acid and calcium carbonate to form mono-calcium phosphate (MCP) or di-calcium phosphate (DCP) proceeds as follows:

MCP:
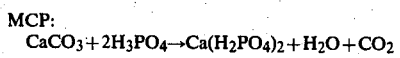

DCP: 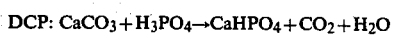

When using Ca-containing phosphoric acid, for example containing Ca from a preneutralizing plant or Ca remaining in the digestion liquor from the Odda process, it is found that with the method according to the invention, $Ca(H_2PO_4)_2$ in the acid, even in a precipitated state, will be converted as follows:

$$Ca(H_2PO_4)_2 + CaCO_3 \rightarrow 2CaHPO_4 + CO_2 + H_2O$$

By using preheated reactants an aqueous suspension of finely ground calcium carbonate can be caused to react very rapidly with phosphoric acid with violent formation of gas and foam. According to the invention such violent reaction between hot reactants is utilized in a very special manner, whereby there takes place an intensive mixing of the reactants without the aid of power-consuming mechanical mixers and where the reaction mixture shortly afterwards is discharged or expelled to the air. Most of the reaction takes place while the reaction mixture is suspended in the air in the form of separate drops of foam. It is during this stage that the sticky consistency normally occurs, and which has been described above as critical with regard to mixability, requirements of power, etc. When the brief period of suspension is over the reaction mixture has the form of a moist, non-sticky grain material.

The process according to the invention is particularly characterized by employing a preheated, aqueous suspension of fine-grained calcium carbonate which is brought to react with preheated phosphoric acid by introducing the reactants into a short, tubular, reaction zone where the resulting gas evolution causes intensive mixing and agitating of the reactants, and where the gas further causes a high pressure which shoots or jettisons a foaming reaction mixture out of the open end of the tubular reaction zone, the reaction being almost completed while the developed drops of reaction mixture are in free suspension, whereafter they are collected in the form of moist, non-sticky particles, without the need for any further quenching treatment of the particles.

BRIEF DESCRIPTION OF THE DRAWINGS

Further objects, characteristics and advantages of the invention will be described in the following detailed description, with reference to the accompanying drawings, wherein.

DETAILED DESCRIPTION OF THE INVENTION

Figure 1:
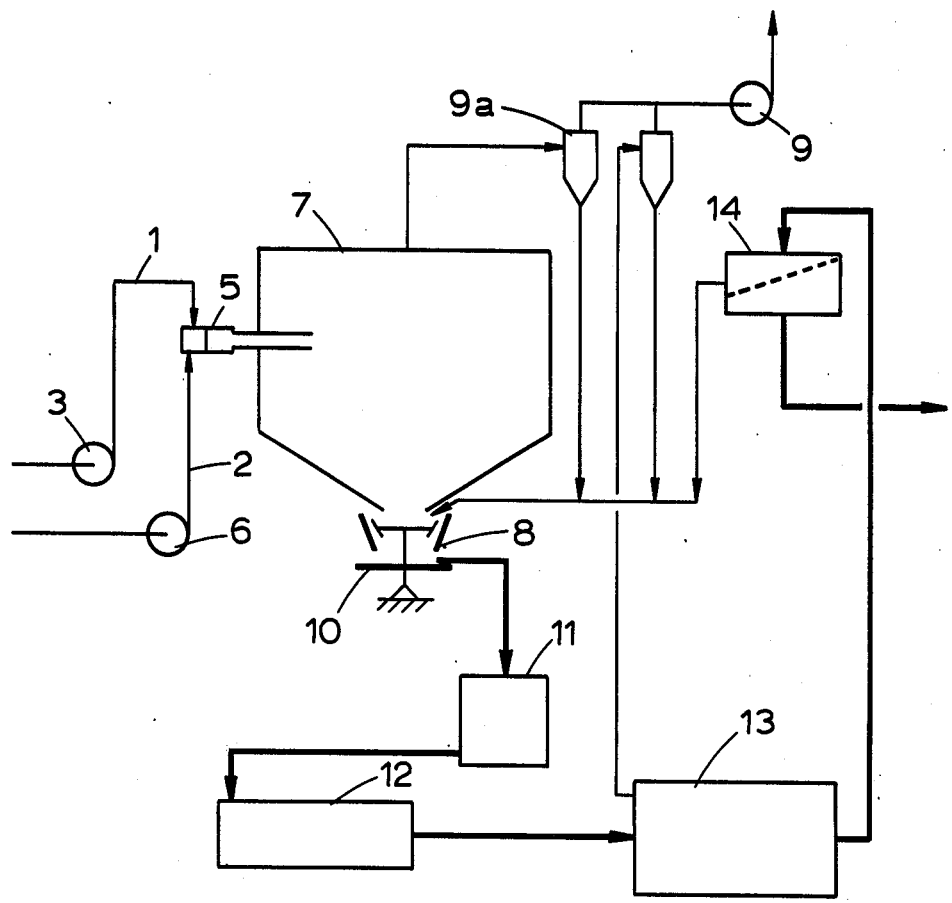
FIG. 1 is a schematic and simplified flow diagram illustrating the method of the invention.

FIG. 1 shows a feed line 1 for calcium carbonate suspension and another feed line 2 for phosphoric acid. A pump 3 pumps the hot chalk suspension through the line 1 to a short tube reactor 5, the design and mode of operation of which will be described in more detail below.

Hot phosphoric acid is pumped through line 2 to the reactor 5 by means of a pump 6, and the two reactants are thoroughly mixed in the reactor and gas and foam are formed. The reaction mixture is then expelled through the open end of the reactor 5 into a chamber 7 where the stream disintegrates into particles which are freely suspended in gas until the reaction product falls down and is collected in a collecting device 8. The upper end of the chamber 7 is fitted with a gas outlet which is connected to a cyclone separator 9a and an exhaust fan 9. When it falls to the bottom of the chamber 7, the animal feed phosphate reaction product is in the form of a moist, but free-flowing product, without the necessity of performing any further quenching treatment. With suitable control and regulation of the reaction conditions there is obtained a product which is easy to handle and which can contain all desired Ca/P ratios.

Because of the development of gas during the reaction between phosphoric acid and calcium carbonate, the product will have a somewhat vesicular structure with gas-filled pores, which at times may be too light for direct mixing with the other components in some types of animal feed mixtures. However, the moist primary material obtained in the first stage of the process is also very suitable for further processing as well as for granulating with other mineral substances and tracers, which may be effectively mixed in the recycle stream prior to the mixing and collecting device 8. The invention therefore provides a method which makes further processing possible and enables the porous structure to be broken down, whereby a granulate with a higher liter weight per volume can be produced. The intermediate product from the collecting device 8 is discharged via a disc feeder 10 which ensures free flow from a wide opening. The desired depth of the material above the disc feeder 10 is achieved by means of a level indicator (not shown in the drawings) which controls the scraping off position of the feeder. The chamber is further provided with instrumentation which enables a controlled flow of air to pass through the porous, hot and somewhat moist product near the outlet. The product is then compacted in a continuously operating single or multistep press 11, from which the material in the form of pressed flakes is led to a granulator 12, where it is granulated in its moist state. A high yield of a non-dusting fine granulate is thereby obtained, which is sent through a dryer 13 and then a screen 14, whereafter the free-flowing, non-adhering granulate is transported to storage.

Figure 2:
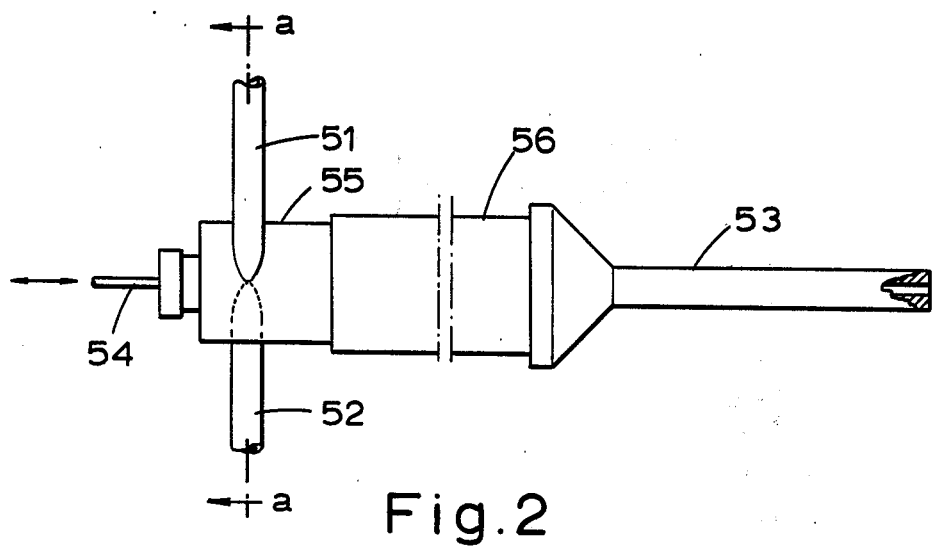
FIG. 2 is an enlarged view of a tube reactor suitable for carrying out the method.
Figure 3:
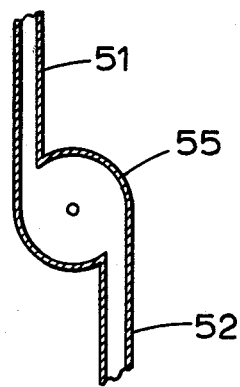
FIG. 3 is a cross-sectional view through the reactor, taken along the line a—a in FIG. 2.

The tube reactor 5 is shown in more detail in FIGS. 2 and 3. It consists of three main sections, a mixing chamber 55, a pressure chamber 56 and a discharge tube 53. Two separate feed lines 51 and 52 direct the reactants tangentially into the mixing chamber 55 (as shown in FIG. 3) in such a way as to cause a powerful turbulence and mixing as the formation of gas increases in intensity. A high pressure is generated in the pressure chamber 56, which pressure expels and accelerates the flow of foaming mixture through the somewhat narrower outlet of the discharge tube 53. This tube is preferably detachable from the pressure chamber and may be given various constructional forms. The cross-section and the total reactor volume selected may be such that there is optimum initial velocity of the reaction mixture in relation to the reactivity of the reactants. The choice of materials of the reactor is not critical and the outlet may be of polished steel, Teflon or some other plastic or rubber material. Plastic and rubber materials are preferred if the components in the mixture have a tendency to deposit layers in the inside of the reactor. At the rear, closed end of the reactor a rod 54 is arranged, which can be used to keep the reactor open if it becomes clogged, e.g. as a result of an unexpected shutdown of the system.

The process of the invention will be further understood from the following examples.

EXAMPLE 1 (MCP)

55.1 kg/h of precipitated calcium carbonate, ground to an average grain size of 15–20μ and with a maximum particle size of about 50μ was used in the form of a 60% suspension in water. The temperature of the suspension was 90°±3° C., and the suspension was fed continuously to the reactor together with 127.5 kg of phosphoric acid per hour at 116°±2° C. The acid contained 82.8% $H_3PO_4$.

184 kg/h of a product containing 21.8% $H_2O$ was obtained prior to the granulating process. The carbon dioxide content was 0.6%, and the material was well suited for transport and handling, and eventual granulation. It was easy to dry the product continuously to a water content of below 1.4%. After drying the particles were strong and dense. The P content in the dried granulate was 22.6%. The weight ratio of Ca/P was 0.71.

EXAMPLE 2 (MCP)

Calcium carbonate of the same fineness as that used in Example 1 was reacted with a less concentrated phosphoric acid, which resulted in a more aqueous reaction product. 141.8 kg of 74.5% phosphoric acid and 88.8 kg of 64.5% calcium carbonate suspension per hour were fed to the reactor which was operated at a pressure of 3.2 ato. This resulted in a very fine-grained reactor product having properties which made it suitable for further handling and granulation.

EXAMPLE 3 (MCP)

Calcium carbonate of the same origin as in Example 1, but with an average grain size of 50μ, was processed in the same pilot plant. The concentration and quantity of the suspension were the same as in Example 1, and the temperature was 87° C. The acid content was the same as in Example 1, and the temperature was 117°±1° C. The drying process was time-consuming and the product was incompletely dried. The product was sticky and corrosive and contained 3.7% $CO_2$. The stickiness proved to be a nuisance during a subsequent granulation process.

EXAMPLE 4 (DCP)

The following example and Example 7 show how the DCP was produced. A product with low P-analysis was produced in the same apparatus as used in the aforementioned examples, by reacting an increased quantity of carbonate with phosphoric acid.

Precipitated calcium carbonate ground to 98% under 20μ, corresponding to an average grain size of 4–5μ, was used in a 59% suspension in water. The suspension was heated to 65° C. only, and 177 kg/h was fed to the reactor. 110 kg/h of an 87.6% phosphoric acid at a temperature of 113° C. was fed to the reactor.

The reaction product contained 33% $H_2O$ and 1.8% $CO_2$, and was suitably plastic for granulation. With a weight ratio of Ca/P=1.4 the analysis of the dried product showed 18.8% P and 26.5% Ca.

EXAMPLE 5 (MCP)

Precipitated calcium carbonate of practically the same fineness as that used in Example 1 was prepared as a 42.6% suspension in water, and a quantity of 54 kg/h was fed to the reactor at 92° C. In order to produce an animal feed grade phosphate containing about 24% P this quantity of chalk was reacted with a F-free, Ca-containing phosphoric acid at 128° C. at the rate of 128.6 kg/h. The P-content of the acid was 25.9% and the weight ratio of Ca/P was 0.43, so that the product's Ca/P would be close to 0.70.

Reaction velocity was satisfactory, and the plasticity and the water content of the reaction product made it well suited for granulation (with 18.5% $H_2O$). The product contained 0.6% $CO_2$ as a result of non-converted $CaCO_3$.

EXAMPLE 6 (MCP)

The same grade of calcium carbonate as used in Example 5, but in a less aqueous suspension, i.e. slightly above 60% $CaCO_3$, was reacted with the same acid and under the same conditions and temperatures. Reaction was slow and incomplete. The product was unsuitable for granulation and was found to contain 2.5% $CO_2$. There was a considerable degree of delayed reaction when the product was further processed.

EXAMPLE 7 (DCP)

Calcium carbonate of an average grain size of 10–15μ, but in a 46.8% suspension fed at the rate of 159.6 kg/h was advantageously reacted at 98° C. with 129.1 kg/h of Ca-containing phosphoric acid with a ratio of Ca/P=0.322 and a total of 25.8% P. The temperature of the acid was 132° C. The more time-consuming reaction did not prevent the further processing of the reaction product with about 35% $H_2O$. With a Ca/P ratio=1.22 there was no acid residue giving trouble, in spite of a non-reacted quantity of carbonate, giving a $CO_2$ analysis of 1.7%.

The greater quantity of water removed during drying resulted in the product having a weight of 750 g per liter when all particles under 0.1 mm and over 1.5 mm were removed. Particle strength was also somewhat weak compared with a product with a lower Ca/P ratio. A product sample with 3% $H_2O$ (determined by drying for 3 hours at 105° C.) had a P analysis=20.1%.

EXAMPLE 8 (Storage tests)

Various qualities of the animal feed grade phosphates were stored for 12 weeks under fluctuating climatic conditions. The bags were placed in hydraulic presses under a pressure of about 1500 kg. The calcium phosphates had a Ca/P weight ratio of 0.7–1.3. There were no particles over 1.5 mm. Those below 0.1 mm accounted for 1–23% and the water content, determined by drying for 3 hours at 105° C., was 0.4–4.9.

Mixtures containing up to 33% finely crushed limestone and up to 6% powdered MgO were also prepared from the same products. Only one showed signs of caking after a storage period of twelve weeks. This was a deliberately poorly dried and dusty MCP, mixed with limestone (18% dust and 4% water).

Mixtures containing MgO showed no signs of caking, neither did MCP alone, even with 23% dust and 5% $H_2O$.

All percentages given in the above examples refer to weight percent.

The above examples illustrate the complex variable but interdependent set of operation parameters of the present invention, as follows:

Average $CaCO_3$ particle size: 3<50μ, preferably 3–20μ

Concentration of $CaCO_3$ suspension with Ca-containing phosphoric acid: 40–60% by weight Concentration of $CaCO_3$ with pure phosphoric acid: 45–65% by weight Ca/P ratio of Ca-containing phosphoric acid: no greater than 0.45

Temperature of suspension: 50°–120° C., preferably 65°–100° C.

Temperature of acid: 100°–150° C., preferably 113°–132° C.

Strength of pure phosphoric acid: 74–88% by weight of $H_3PO_4$ (for the Ca-containing phosphoric acid: the equivalent amount of $P_2O_5$)

The precise interdependency of these parameters is difficult to calculate, and it is perhaps possible that the process of the present invention will be operable with slight deviations from one or more of the above parameter ranges. However, it has generally been found that operating outside of these parameter ranges gives unsatisfactory results, and specifically an unsatisfactory degree of reaction and an unsatisfactory product consistency.

The above Examples 1–8 are provided primarily to illustrate the versatility of the process of the present invention. It will be apparent from these examples that it will be necessary to make certain adjustments within the above parameter ranges to meet the practical requirements in a production plant for the production of MCP, DCP, as well as mixtures thereof. It is believed however that any such variations or adjustments will be a function of the basic chemistry of the production of the precise product intended, and thus will be readily understood by those skilled in the art.

Additionally, the above examples illustrate that the present process is employable with the use of pure phosphoric acid as well as Ca-containing phosphoric acid. As noted above, when relatively pure, concentrated phosphoric acid is employed, the strength should be from 74 to 88% by weight of $H_3PO_4$. However, as will be understood by those skilled in the art, when employing a Ca-containing phosphoric acid, the concentration thereof will be based on an equivalent range or amount of $P_2O_5$. Those ordinarily skilled in the art will understand how to determine such equivalent amount of $P_2O_5$.

One of the most critical of the above noted parameters is the average particle size of the $CaCO_3$. Example 3 illustrates the desirability of having the average particle size less than 50μ. Specifically, in Example 3, employing an average $CaCO_3$ particle size of 50μ, the product was too sticky to be of any use. A preferred average grain size is in the range of from 3 to 20μ, and as shown in Example 4, a very finely ground calcium carbonate ground to 98% under 20μ with an average grain size of 4–5μ, resulted in an entirely suitable product. The use of such finely grained material in accordance with the above parameters is contrary to the expectation of the prior art, wherein in order to prevent consistency problems much coarser particles were normally used to control the reaction. Specifically, in prior processes coarser particles were used with increased quantities of water. The use of extremely relatively coarse calcium carbonate particles would not however provide a sufficiently reactive reaction and, as discussed above regarding Example 3, would result in an unsatisfactory product consistency.

An additional important parameter is the concentration of the $CaCO_3$ suspension. When the $CaCO_3$ suspension is mixed with a relatively pure phosphoric acid, the concentration of the $CaCO_3$ suspension should be limited to from 45–65% by weight. On the other hand, when the $CaCO_3$ suspension is mixed with Ca-containing phosphoric acid, the concentration of the $CaCO_3$ suspension should be somewhat reduced, and specifically from 40–60% by weight. The importance of this limitation is emphasized by a comparison of Examples 5 and 6. Specifically, when employing Ca-containing phosphoric acid, when the concentration of the $CaCO_3$ suspension is increased from 42.6% by weight as shown in Example 5 to just slightly more than 60% by weight as shown in Example 6, and with all other parameters being the same, the reaction will be incomplete giving a $CO_2$ content of 2.5% in the granulated product. However, when the $CaCO_3$ suspension is mixed with relatively pure phosphoric acid, as shown in Example 2, the use of a $CaCO_3$ suspension having a concentration greater than 60% by weight results in entirely satisfactory results.

Mineral as well as precipitated calcium carbonate may be used. The later may be calcium carbonate converted from calcium nitrate $Ca(NO_3)_2$ from the Odda process with $NH_3$ and $CO_2$.

As already mentioned, the process is also flexible, since MCP or DCP or mixtures thereof can be manufactured. The flexibility of the process with respect to raw materials has already been described. Both Ca-free and Ca-containing phosphoric acid have proved to be suitable, the quantity of $CaCO_3$ being correspondingly reduced in relation to the amount of calcium contained in the phosphoric acid.

Adjustment of the water content of the chalk suspension, and adjustment of other process variables, within the above ranges, ensure the desired reaction velocity and consistency if the process described is adhered to.

Ca-containing acid, which gives rise to the most difficult consistency problems when used in the conventional manufacture of animal feed grade phosphates, is surprisingly easy to employ in the present process.

However, it is important that the Ca/P weight ratio of the Ca-containing phosphoric acid not be too high, and according to the invention it has been found best to employ a Ca/P ratio of no greater than 0.45 to avoid paste formation.

The phosphoric acid and the chalk suspension are preheated before being introduced into the reaction zone. As noted above, temperatures of 50°–120° C., and preferably of 65°–100° C., in the case of the chalk suspension and of 100°–150° C., and preferably of 113°–132° C., in the case of phosphoric acid may be employed in accordance with the invention. This meets the requirements with regard to degree of reaction and product consistency with calcium carbonate of reasonable grain fineness. If the calcium carbonate is very finely ground the temperatures may be correspondingly reduced so that the desired reactivity is always easy to achieve.

As stated above, it is believed that the employment of the above parameters within the noted ranges, and as modified by basic practical chemical requirements to result in the specifically desired reaction product, are important. Specifically, the use of such parameters results in the following critical features of the present invention:

1. When the reactants are introduced into a specially designed reaction zone at the prescribed concentrations and temperatures, there results a strong gas formation and intensive mixing.

2. The reactant mixture is ejected from the reaction zone into the atmosphere before the reaction has proceeded to a point whereat the reaction mixture would become viscous.

3. The individual particles of the reaction mixture are maintained freely suspended in the atmosphere for a time period long enough to complete the critical viscous phase of the reaction while the particles are suspended.

Thus, it will be apparent that in accordance with the present invention the reactants are initially prepared for a rapid reaction, are introduced into a reaction zone which is designed for optimum utilization of the characteristics of the reaction, i.e. strong gas evolution with excessive foaming and a temporary high viscosity phase. In this manner, these reaction characteristics which have previously been considered completely undesirable in that they were considered to cause severe operational problems for this type of reaction have been utilized in such a way that not only are such previous problems avoided, but in addition the process itself is improved and simplified. That is, by the above combined procedures and parameters, the overall production process has been substantially streamlined by proceeding in a manner heretofore considered impractical in a calcium phosphate production process.

Various modifications may be made to the above specifically described structural arrangements and operations without departing from the scope of the invention.

What is claimed is:

1. A method of producing animal feed grade phosphates as mono-calcium phosphate, di-calcium phosphate or mixtures thereof, said method comprising:
   providing an aqueous calcium carbonate suspension, preheated to a temperature of from 50° to 120° C., in which the calcium carbonate has an average grain size of $3<50\mu$, and having a concentration of 45-65% by weight $CaCO_3$;
   providing a pure, relatively concentrated phosphoric acid solution containing from 74 to 88 wt. % of $H_3PO_4$ and preheated to a temperature of from 100° to 150° C.;
   introducing said preheated calcium carbonate suspension and said preheated phosphorice acid solution, in suitable relative quantities to achieve a desired calcium phosphate reaction product, into a short tubular reaction zone having a closed first end and an open second end, and intensively mixing said calcium carbonate suspension and said phosphoric acid solution within said reaction zone to thereby react said calcium carbonate suspension and said phosphoric acid solution to generate gas and a desired calcium phosphate reaction produce in foam form;
   ejecting by means of said gas formed in said reaction zone and prior to completion of the reaction the foamed reaction product in the form of a stream from said open second end of said reaction zone into a gaseous atmosphere, and thereby disintegrating said stream into individual particles freely suspended in said gaseous atmosphere, the reaction being substantially completed while said individual particles are freely suspended in said gaseous atmosphere, thereby forming moist but free-flowing calcium phosphate granules; and
   collecting said granules without any further quenching treatment thereof.

2. A method as claimed in claim 1, further comprising compressing the thus collected moist granules to form compressed flakes, and thereafter granulating the thus compressed flakes.

3. A method as claimed in claim 1, wherein the average grain size of said calcium carbonate is $3-20\mu$.

4. A method as claimed in claim 1, wherein said calcium carbonate suspension temperature is from 65° to 100° C.

5. A method as claimed in claim 1, wherein said phosphoric acid solution temperature is from 113° to 132° C.

6. A method as claimed in claim 1, wherein said reaction zone is cylindrically shaped, and wherein said calcium carbonate suspension and said phosphoric acid solution are introduced into said cylindrical reaction zone tangentially thereof from opposite directions and on opposite sides thereof.

7. A method as claimed in claim 1, wherein said reaction zone has at said open second end thereof an outlet of a size smaller than said reaction zone, and wherein said foamed reaction product is ejected from said reaction zone through said reduced size outlet.

8. A method of producing animal feed grade phosphates such as mono-calcium phosphate, di-calcium phosphate or mixtures thereof, said method comprising:
   providing an aqueous calcium carbonate suspension, preheated to a temperature of from 50° to 120° C., in which the calcium carbonate has an average grain size of $3<50\mu$, and having a concentration of 40°-60° by weight $CaCO_3$;
   providing Ca-containing phosphoric acid preheated to a temperature of from about 100° to 150° C.;
   introducing said preheated calcium carbonate suspension and said preheated phosphoric acid, in suitable relative quantities to achieve a desired calcium phosphate reaction product, into a short tubular reaction zone having a closed first end and an open second end, and intensively mixing said calcium carbonate suspension and said phosphoric acid within said reaction zone to thereby react with calcium carbonate suspension and said phosphoric acid to generate gas and a desired calcium phosphate reaction product in foam form;
   ejecting by means of said gas formed in said reaction zone and prior to completion of the reaction the foamed reaction product in the form of a stream from said open second end of said reaction zone into a gaseous atmosphere, and thereby disintergrating said stream into individual particles freely suspended in said gaseous atmosphere, the reaction being substantially completed while said individual particles are freely suspended in said gaseous atmosphere, thereby forming moist but free-flowing calcium phosphate granules; and
   collecting said granules without any further quenching treatment thereof.

9. A method as claimed in claim 7, further comprising compressing the thus collected moist granules to form compressed flakes, and thereafter granulating the thus compressed flakes.

10. A method as claimed in claim 7, wherein the average grain size of said calcium carbonate is $3<20\mu$.

11. A method as claimed in claim 7, wherein said calcium carbonate suspension temperature is from 65° to 100° C.

12. A method as claimed in claim 7, wherein said phosphoric acid temperature is from 113° to 132° C.

13. A method as claimed in claim 7, wherein the maximum Ca/P ratio of said Ca-containing phosphoric acid is 0.45.

14. A method as claimed in claim 7, wherein said reaction zone is cylindrically shaped, and wherein said calcium carbonate suspension and said phosphoric acid are introduced into said cylindrical reaction zone tangentially thereof from opposite directions and on opposite sides thereof.

15. A method as claimed in claim 1, wherein said reaction zone has at said open second end thereof an outlet of a size smaller than said reaction zone, and wherein said foamed reaction produce in ejected from said reaction zone through said reduced size outlet.

* * * * *